(12) United States Patent
Murata et al.

(10) Patent No.: US 10,501,319 B2
(45) Date of Patent: Dec. 10, 2019

(54) OPERATION METHOD FOR HYDROGEN PRODUCTION APPARATUS, AND HYDROGEN PRODUCTION APPARATUS

(71) Applicant: Osaka Gas Co., Ltd., Osaka (JP)

(72) Inventors: Kazuhiko Murata, Osaka (JP); Tsubasa Shimizu, Osaka (JP); Satoshi Takagi, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 27 days.

(21) Appl. No.: 15/541,398

(22) PCT Filed: Dec. 24, 2015

(86) PCT No.: PCT/JP2015/086057
§ 371 (c)(1),
(2) Date: Jul. 3, 2017

(87) PCT Pub. No.: WO2016/111184
PCT Pub. Date: Jul. 14, 2016

(65) Prior Publication Data
US 2018/0022605 A1 Jan. 25, 2018

(30) Foreign Application Priority Data
Jan. 5, 2015 (JP) ................................ 2015-000408

(51) Int. Cl.
*C01B 3/48* (2006.01)
*B01J 8/04* (2006.01)
(Continued)

(52) U.S. Cl.
CPC .............. *C01B 3/48* (2013.01); *B01D 53/053* (2013.01); *B01J 8/0492* (2013.01); *B01J 8/0496* (2013.01);
(Continued)

(58) Field of Classification Search
CPC ....................................................... C01B 3/48
(Continued)

(56) References Cited

U.S. PATENT DOCUMENTS

2006/0000141 A1 1/2006 Kuwabara et al.
2006/0090397 A1 5/2006 Edlund et al.
(Continued)

FOREIGN PATENT DOCUMENTS

JP 200021431 A 1/2000
JP 2004155650 A 6/2004
(Continued)

OTHER PUBLICATIONS

Machine translation provided for JP 2004299996 downloaded Jan. 14, 2019 (Year: 2019).*

*Primary Examiner* — Douglas B Call
(74) *Attorney, Agent, or Firm* — The Webb Law Firm

(57) ABSTRACT

A hydrogen production apparatus including a desulfurizer, a reformer, a CO transformer a gas flow path, and a purge gas supply path which is provided where a purge gas is supplied to an upstream side of a pressure feeding apparatus in the gas flow path, prior to a stopping operation, a purging step of replacing gas within the gas flow path with the purge gas and filling the purge gas into the gas flow path is performed, and in a start-up operation in which a heating means is operated to increase the temperature of the gas within the gas flow path, which is performed prior to a hydrogen purification operation, a pressure increasing step of supplying the purge gas from the purge gas supply path to the closed circulation circuit and increasing the pressure within the closed circulation circuit is performed.

5 Claims, 4 Drawing Sheets

(51) Int. Cl.
    *B01D 53/053*     (2006.01)
    *C01B 3/56*     (2006.01)
    *H01M 8/0612*     (2016.01)
    *H01M 8/0662*     (2016.01)
    *H01M 8/04223*     (2016.01)
    *C01B 3/38*     (2006.01)

(52) U.S. Cl.
    CPC ............... *C01B 3/38* (2013.01); *C01B 3/384* (2013.01); *C01B 3/56* (2013.01); *H01M 8/04231* (2013.01); *H01M 8/0612* (2013.01); *H01M 8/0675* (2013.01); *B01D 2253/102* (2013.01); *B01D 2253/106* (2013.01); *B01D 2253/108* (2013.01); *B01D 2256/16* (2013.01); *B01D 2259/403* (2013.01); *C01B 2203/0233* (2013.01); *C01B 2203/0283* (2013.01); *C01B 2203/042* (2013.01); *C01B 2203/043* (2013.01); *C01B 2203/0805* (2013.01); *C01B 2203/0816* (2013.01); *C01B 2203/1058* (2013.01); *C01B 2203/127* (2013.01); *C01B 2203/1241* (2013.01); *C01B 2203/1276* (2013.01); *C01B 2203/1604* (2013.01); *C01B 2203/1609* (2013.01)

(58) Field of Classification Search
    USPC ....................................................... 423/648.1
    See application file for complete search history.

(56) References Cited

U.S. PATENT DOCUMENTS

| | | |
|---|---|---|
| 2007/0062116 A1 | 3/2007 | Edlund et al. |
| 2013/0126038 A1 | 5/2013 | Jamal et al. |

FOREIGN PATENT DOCUMENTS

| | | |
|---|---|---|
| JP | 2004299996 A | 10/2004 |
| JP | 2005122920 A | 5/2005 |
| JP | 2008518871 A | 6/2008 |
| JP | 2016675 A | 1/2016 |

* cited by examiner

OPERATION METHOD FOR HYDROGEN PRODUCTION APPARATUS, AND HYDROGEN PRODUCTION APPARATUS

CROSS-REFERENCE TO RELATED APPLICATIONS

This application is the United States national phase of International Application No. PCT/JP2015/086057 filed Dec. 24, 2015, and claims priority to Japanese Patent Application No. 2015-000408 filed Jan. 5, 2015, the disclosures of which are hereby incorporated in their entirety by reference.

TECHNICAL FIELD

The present invention relates to an operation method for a hydrogen production apparatus, and the hydrogen production apparatus, including a desulfurizer that desulfurizes a source gas, a reformer that heats the desulfurized source gas in a state mixed with steam with a heating means and obtains a reformed gas, a CO transformer that causes carbon monoxide in the reformed gas to react with steam, and a hydrogen purification unit that separates impurities other than hydrogen from transformed gas after processing by the CO transformer to purify hydrogen gas, a gas flow path being provided that allows gas to flow to the desulfurizer, the reformer, the CO transformer, and the hydrogen purification unit, and a pressure feeding apparatus being provided that causes gas to flow in the gas flow path, and a hydrogen purification operation of driving the heating means and the pressure feeding apparatus to supply the source gas to the gas flow path, and a stopping operation of stopping driving of the heating means and the pressure feeding apparatus, being performed in order.

BACKGROUND ART

Recently, development of hydrogen production apparatuses that produce hydrogen on location (on site) has been conducted using natural gas, city gas, or the like as a source gas. Such a hydrogen production apparatus is used in industrial applications such as bright annealing of metals such as steel plates or glass manufacturing, and also is installed on the island of Chubu International Airport, for example, as a hydrogen station that replenishes hydrogen in fuel cell vehicles.

As an example of this sort of hydrogen production apparatus, an apparatus is known that is provided with a desulfurizer that desulfurizes a source gas that is pressure-fed by a pressure feeding apparatus, a reformer that heats the desulfurized source gas in a state mixed with steam and obtains a reformed gas, a CO transformer that causes carbon monoxide in the reformed gas from the reformer to react with steam to obtain a hydrogen-rich gas, and a hydrogen purification unit (for example, an apparatus using a PSA scheme) that separates impurities other than hydrogen from the hydrogen-rich gas to purify the hydrogen.

When producing hydrogen in the hydrogen purification apparatus, it is necessary to maintain the desulfurizer at about 200 to 300° C., the reformer at about 700 to 800° C., and the CO transformer at about 200 to 450° C., and therefore, for example, a configuration is adopted in which a heating apparatus is provided that burns a fuel gas (for example, a city gas 13A) supplied from the outside to increase the temperature of a catalyst of the reformer, and by guiding the reformed gas at a relatively high temperature, which has been heated by passing through the heated reformer catalyst, to the CO transformer, the temperature of the CO transformer is increased, and also, the temperature of the desulfurizer provided in the CO transformer is increased as well.

Also, as another hydrogen production apparatus, an apparatus is known that is provided with a reformer that mixes steam with a source gas and heats the mixture to obtain a reformed gas, a pressure increasing apparatus that increases the pressure of the reformed gas, and a PSA-type hydrogen purification unit that separates the reformed gas at increased pressure into hydrogen and off-gas other than hydrogen (see Patent Document 1).

In the hydrogen production apparatus disclosed in Patent Document 1, a closed circulation circuit is formed where gas is circulated between the desulfurizer, the reformer, and the CO transformer. Gas is circulated in the closed circulation circuit during a start-up operation, and after the temperature of the gas is increased, a hydrogen purification operation by the hydrogen purification unit is started. Thus, loss of time when starting up the hydrogen purification unit is reduced.

PRIOR ART DOCUMENTS

Patent Documents

Patent Document 1: JP 2004-299996A

DISCLOSURE OF THE INVENTION

Problem to be Solved by the Invention

Here, before stopping the hydrogen purification operation and operation of the reformer in the hydrogen production apparatus disclosed in Patent Document 1, a purging step is performed in which the gas in the closed circulation circuit is replaced with a hydrogen-rich gas, and the hydrogen-rich gas is filled into the closed circulation circuit. In the purging step, the hydrogen-rich gas is filled into the closed circulation circuit, so the pressure within the closed circulation circuit is greatly influenced by the supply pressure of the hydrogen-rich gas, and normally the pressure is relatively low (for example, about 0.2 MPaG).

When the pressure within the closed circulation circuit is relatively low, only a small amount of gas can be heated by the heating means in the reformer to become the heat transport medium within the closed circulation circuit. In this case, it takes more time to sufficiently transport the heat conferred by the heating means to the desulfurizer and the CO transformer.

In other words, it is desired to provide a technique of quickly heating the desulfurizer, the reformer, and the CO transformer when starting up the hydrogen production apparatus again after stopping operation of the hydrogen production apparatus.

Means for Solving Problem

In a characteristic configuration of an operation method of a hydrogen production apparatus, the hydrogen production apparatus includes a desulfurizer that desulfurizes a source gas, a reformer that heats the desulfurized source gas in a state mixed with steam with a heating means and obtains a reformed gas, a CO transformer that causes carbon monoxide in the reformed gas to react with steam, and a hydrogen purification unit that separates impurities other than hydrogen from transformed gas after processing by the CO transformer to purify hydrogen gas, a gas flow path being provided that allows gas to flow to the desulfurizer, the reformer, the CO transformer, and the hydrogen purification unit, and a pressure feeding apparatus being provided that causes gas to flow in the gas flow path, and a hydrogen purification operation of driving the heating means and the pressure feeding apparatus to supply the source gas to the gas flow path, and a stopping operation of stopping driving of the heating means and the pressure feeding apparatus, being performed in order, in which a closed circulation circuit that returns and circulates gas by the pressure feeding apparatus in order of the desulfurizer, the reformer, and then the CO transformer while bypassing the hydrogen purification unit, is provided in the gas flow path, and a purge gas supply path is provided where a purge gas is supplied to an upstream side of the pressure feeding apparatus in the gas flow path, prior to the stopping operation, a purging step of replacing the gas within the gas flow path with the purge gas and filling the purge gas into the gas flow path is performed, and in a start-up operation in which the heating means is operated to increase the temperature of the gas within the gas flow path, which is performed prior to the hydrogen purification operation, a pressure increasing step of supplying the purge gas from the purge gas supply path to the closed circulation circuit, and increasing the pressure within the closed circulation circuit is performed.

According to the above characteristic configuration, a gas flow path is provided that allows gas to flow to the desulfurizer, the reformer, the CO transformer, and the hydrogen purification unit, so it is possible to perform the hydrogen purification operation of driving the heating means and the pressure feeding apparatus to supply the source gas to the gas flow path, and purifying hydrogen gas with the hydrogen purification unit.

Also, the purge gas supply path where the purge gas is supplied to the upstream side of the pressure feeding apparatus in the gas flow path is provided, so prior to the stopping operation of stopping driving of the heating means and the pressure feeding apparatus, it is possible to perform the purging step of replacing the gas within the gas flow path with the purge gas, and filling the purge gas into the gas flow path, and thus it is possible to replace the gas within the closed circulation circuit with the purge gas.

Further, the closed circulation circuit that returns and circulates gas in order of the desulfurizer, the reformer, and then the CO transformer while bypassing the hydrogen purification unit is provided in the gas flow path, so it is possible for gas within the closed circulation circuit that passes through the CO transformer to be recirculated by the pressure feeding apparatus to the desulfurizer, the reformer, and the CO transformer while bypassing the hydrogen purification unit.

In this regard, when the purging step as described above is performed, in a case where there is a decrease in the internal pressure of the gas flow path and the closed circulation circuit into which the purge gas has been filled, also in the stopping operation of stopping driving of the heating means and the pressure feeding apparatus performed after the purging step, the internal pressure of the gas flow path and the closed circulation circuit remains in a decreased state.

Therefore, in a state where the internal pressure has decreased in this manner, even if prior to the hydrogen purification operation, the start-up operation is performed to drive the heating means to increase the temperature of the gas within the gas flow path (even if the purge gas is circulated and transported within the closed circulation circuit by driving the heating means and the pressure feeding apparatus), the heat conferred to the purge gas by the heating means is not easily transferred to the desulfurizer and the CO transformer, and therefore more time is needed to sufficiently heat the desulfurizer and the CO transformer.

On the other hand, according to the above characteristic configuration, in the start-up operation in which the heating means is operated to increase the temperature of the gas within the gas flow path, which is performed prior to the hydrogen purification operation, the pressure increasing step of supplying the purge gas from the purge gas supply path to the upstream side of the pressure feeding apparatus in the closed circulation circuit, and increasing the pressure within the closed circulation circuit is performed. Note that in the start-up operation, the gas that has been recirculated in the closed circulation circuit sequentially transfers the heat quantity obtained from the heating means of the reformer to the CO transformer and the desulfurizer.

In this way, when the pressure increasing step is performed in the start-up operation, it is possible to increase the internal pressure of the closed circulation circuit that decreased in the purging step, so the amount of gas that flows within the closed circulation circuit can be increased, and the heat conferred to the purge gas by the heating means can be efficiently transported by the purge gas, and transferred to the desulfurizer, the reformer, and the CO transformer. Therefore, in the start-up operation, the heat necessary in order to increase the temperature of the desulfurizer, the reformer, and the CO transformer is supplied more efficiently than by the heating means, so the temperature of the desulfurizer, the reformer and the CO transformer can be quickly increased.

Also, in the pressure increasing step, by supplying the purge gas from the purge gas supply path to the closed circulation circuit, the pressure within the closed circulation circuit can be increased using the pressure-feeding force of the pressure feeding apparatus, so it is possible to increase pressure by effectively using a configuration conventionally provided in a hydrogen production apparatus.

Accordingly, after performing the purging step and the stopping operation, when again performing the hydrogen purification operation, it is possible to quickly heat the entire apparatus, and therefore possible to quickly start up the hydrogen production apparatus, so the hydrogen purification operation can be performed quickly, and therefore it is possible to realize an operation method for a hydrogen production apparatus that enables supply and production of hydrogen to be performed quickly.

In a further characteristic configuration of an operation method for a hydrogen production apparatus, a throttle unit is provided in a return path that returns and circulates gas while bypassing the hydrogen purification unit in the closed circulation circuit, the throttle unit switching between a throttled state in which a large flow path resistance is set and a throttle released state in which a small flow path resistance is set, and the pressure increasing step is performed with the throttle unit switched to the throttled state.

According to the above characteristic configuration, the throttle unit, which switching between the throttled state in which a large flow path resistance is set and the throttle released state in which a small flow path resistance is set, is provided in the return path that returns and circulates gas while bypassing the hydrogen purification unit in the closed circulation circuit, so when gas is caused to flow through the closed circulation circuit by the pressure feeding apparatus in a state with the throttle unit switched to the throttled state in which a large flow path resistance is set, pressure loss is received in the throttle unit, and thus the pressure on the upstream side from the throttle unit in the closed circulation circuit can be increased compared to the pressure on the downstream side.

Also, when the pressure on the upstream side of the throttle unit in the closed circulation circuit is increased compared to the pressure on the downstream side, the downstream side of the throttle unit is in a low pressure state compared to the upstream side of the throttle unit, so on the downstream side of the throttle unit, it is possible to assist movement of the purge gas from a product tank to the gas flow path through the purge gas supply path, thus promoting supply of the purge gas. Therefore, in the pressure increasing step in the start-up operation, it is possible to easily increase the purge gas pressure and supply the purge gas, and possible to easily increase the pressure to a sufficient level, and also possible to maintain a high heat transport efficiency of the closed circulation circuit, and as a result it is possible to quickly resume the hydrogen purification operation.

In a further characteristic configuration of an operation method for a hydrogen production apparatus, a pressure detection unit that detects an internal pressure within the closed circulation circuit is provided, and when performing the start-up operation, in a case where the pressure detected by the pressure detection unit is lower than a predetermined pressure, the purge gas is supplied into the closed circulation circuit from the purge gas supply path.

By adopting such a configuration, it is possible to maintain a state in which the pressure within the closed circulation circuit during the start-up operation is higher than the predetermined pressure. Therefore, it is possible to perform the start-up operation while maintaining a state of sufficiently high heat transport efficiency, and thus it is possible to shorten the time required for the start-up operation.

In a further characteristic configuration of an operation method for a hydrogen production apparatus, the purge gas is hydrogen gas that has been purified by the hydrogen purification unit, and stored in a product tank.

When the purge gas is hydrogen gas, after the pressure increasing step has been performed during the start-up operation and the temperature is quickly raised, the gas to be supplied to the hydrogen purification unit from the purge gas supply path is hydrogen gas, and therefore, it is possible to quickly produce hydrogen with the hydrogen purification unit when starting up the hydrogen purification unit. Also, as this hydrogen gas, by using hydrogen gas that has been purified by the hydrogen purification unit and stored in the product tank, the purge gas can be easily procured, and it is possible to configure the purge gas supply path by more effectively using the piping that leads the product hydrogen from the hydrogen purification unit to the product tank than in a case of preparing separate piping.

In a characteristic configuration of a hydrogen production apparatus, the hydrogen production apparatus includes a desulfurizer that desulfurizes a source gas, a reformer that heats the desulfurized source gas in a state mixed with steam with a heating means and obtains a reformed gas, a CO transformer that causes carbon monoxide in the reformed gas to react with steam, and a hydrogen purification unit that separates impurities other than hydrogen from transformed gas after processing by the CO transformer to purify hydrogen gas, a gas flow path being provided that allows gas to flow to the desulfurizer, the reformer, the CO transformer, and the hydrogen purification unit, and a pressure feeding apparatus being provided that causes gas to flow in the gas flow path, and a control apparatus being provided that performs, in order, a hydrogen purification operation of driving the heating means and the pressure feeding apparatus to supply the source gas to the gas flow path, and a stopping operation of stopping the heating means and the pressure feeding apparatus, in which a closed circulation circuit that returns and circulates gas by the pressure feeding apparatus in order of the desulfurizer, the reformer, and then the CO transformer while bypassing the hydrogen purification unit, is provided in the gas flow path, and a purge gas supply path is provided where a purge gas is supplied to an upstream side of the pressure feeding apparatus in the gas flow path, the control apparatus, prior to the stopping operation, performs a purging step of replacing the gas within the gas flow path with the purge gas and filling the purge gas into the gas flow path, and the control apparatus, in a start-up operation in which the heating means is operated to increase the temperature of the gas within the gas flow path, which is performed prior to the hydrogen purification operation, performs a pressure increasing step of supplying the purge gas from the purge gas supply path to the closed circulation circuit and increasing the pressure within the closed circulation circuit.

According to the above characteristic configuration, a gas flow path is provided that allows gas to flow to the desulfurizer, the reformer, the CO transformer, and the hydrogen purification unit, so it is possible for the control apparatus to perform the hydrogen purification operation of driving the heating means and the pressure feeding apparatus to supply the source gas to the gas flow path, and purify hydrogen gas with the hydrogen purification unit.

Also, the purge gas supply path where the purge gas is supplied to the upstream side of the pressure feeding apparatus in the gas flow path is provided, so the control apparatus, prior to the stopping operation of stopping driving of the heating means and the pressure feeding apparatus, can perform the purging step of replacing the gas within the gas flow path with the purge gas, and filling the purge gas into the gas flow path, and thus the control apparatus can replace the gas within the closed circulation circuit with the purge gas.

Further, the closed circulation circuit that returns and circulates gas in order of the desulfurizer, the reformer, and then the CO transformer while bypassing the hydrogen purification unit is provided in the gas flow path, so it is possible for gas within the closed circulation circuit that passes through the CO transformer to be recirculated by the pressure feeding apparatus to the desulfurizer, the reformer, and the CO transformer while bypassing the hydrogen purification unit.

In this regard, when the purging step as described above is performed, in a case where there is a decrease in the internal pressure of the gas flow path and the closed circulation circuit into which the purge gas has been filled, also in the stopping operation of stopping driving of the heating means and the pressure feeding apparatus performed after the purging step, the internal pressure of the gas flow path and the closed circulation circuit remains in a decreased state.

Therefore, in a state where the internal pressure has decreased in this manner, even if prior to the hydrogen purification operation, the start-up operation is performed to drive the heating means to increase the temperature of the gas within the gas flow path (even if the purge gas is circulated and transported within the closed circulation circuit by driving the heating means and the pressure feeding apparatus), the heat conferred to the purge gas by the heating means is not easily transferred to the desulfurizer and the CO transformer, and therefore more time is needed to sufficiently heat the desulfurizer and the CO transformer.

On the other hand, according to the above characteristic configuration, the control apparatus, in the start-up operation in which the heating means is operated to increase the temperature of the gas within the gas flow path, which is performed prior to the hydrogen purification operation, performs the pressure increasing step of supplying the purge gas from the purge gas supply path to the upstream side of the pressure feeding apparatus in the closed circulation circuit, and increasing the pressure within the closed circulation circuit. Note that in the start-up operation, the gas that has been recirculated in the closed circulation circuit sequentially transfers the heat quantity obtained from the heating means of the reformer to the CO transformer and the desulfurizer.

In this way, when the pressure increasing step is performed in the start-up operation, it is possible to increase the internal pressure of the closed circulation circuit that decreased in the purging step, so the amount of gas that flows within the closed circulation circuit can be increased, and the heat conferred to the purge gas by the heating means can be efficiently transported by the purge gas, and transferred to the desulfurizer, the reformer, and the CO transformer. Therefore, in the start-up operation, the heat necessary in order to increase the temperature of the desulfurizer, the reformer, and the CO transformer is supplied more efficiently than by the heating means, so the temperature of the desulfurizer, the reformer and the CO transformer can be quickly increased.

Also, in the pressure increasing step, by supplying the purge gas from the purge gas supply path to the closed circulation circuit, the pressure within the closed circulation circuit can be increased using the pressure-feeding force of the pressure feeding apparatus, so it is possible to increase pressure by effectively using a configuration conventionally provided in a hydrogen production apparatus.

Accordingly, after performing the purging step and the stopping operation, when again performing the hydrogen purification operation, it is possible to quickly heat the entire apparatus, and therefore possible to quickly start up the hydrogen production apparatus, so the hydrogen purification operation can be performed quickly, and therefore it is possible to realize a hydrogen production apparatus that enables supply and production of hydrogen to be performed quickly.

In a further characteristic configuration of a hydrogen production apparatus, a first return path having a small flow path cross-sectional area that sets a large flow path resistance, and a second return path having a large flow path cross-sectional area that sets a small flow path resistance, are provided in parallel in a return path that returns and circulates gas while bypassing the hydrogen purification unit in the closed circulation circuit, a throttle unit that switches between a throttled state in which a large flow path resistance of the return path is set by opening a first on/off valve provided in the first return path and closing a second on/off valve provided in the second return path, and a throttle released state in which a small flow path resistance of the return path is set by opening at least the second on/off valve provided in the second return path, is provided, and the control apparatus performs the pressure increasing step with the throttle unit switched to the throttled state.

According to the above characteristic configuration, the first return path having a small flow path cross-sectional area that sets a large flow path resistance, and the second return path having a large flow path cross-sectional area that sets a small flow path resistance, are provided in parallel as a return path that returns and circulates gas while bypassing the hydrogen purification unit, so it is possible to switch between the throttled state in which a large flow path resistance of the return path is set by opening the first on/off valve provided in the first return path and closing the second on/off valve provided in the second return path, and the throttle released state in which a small flow path resistance of the return path is set by opening at least the second on/off valve provided in the second return path. Thus, it is possible to efficiently switch between the throttled state and the throttle released state by simply opening/closing each flow path, and perform the pressure increasing step in the throttled state. Also, in the throttled state, instead of simply closing the return path, it is possible to circulate some amount of gas within the closed circulation circuit. Therefore, even in the throttled state, flow of the purge gas is maintained in the return path, and an effect is obtained that gas flow through the closed circulation circuit in the order of the desulfurizer, the reformer, and then the CO transformer is rectified.

BEST MODE FOR CARRYING OUT THE INVENTION

Figure 1:
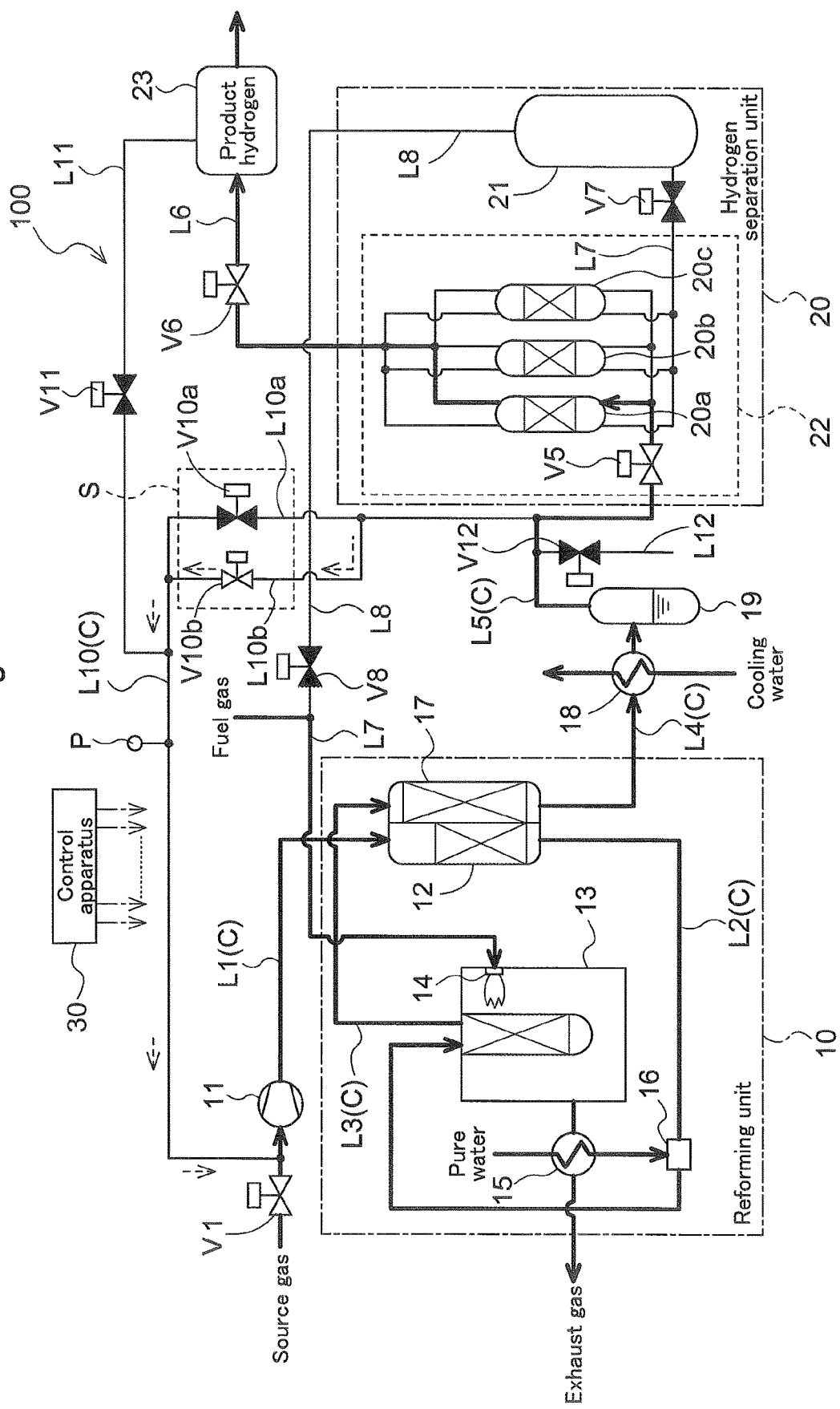
FIG. 1 is a schematic configuration diagram of a hydrogen production apparatus, and shows a flow state of gas during a hydrogen purification operation.

Following is a description of a hydrogen production apparatus according to an embodiment of the present invention. Note that although preferred embodiments are described below, each of these embodiments is described in order to disclose more specific examples of the present invention, and various modifications are possible without departing from the spirit of the present invention, and the present invention is not limited by the following description.
Hydrogen Production Apparatus A hydrogen production apparatus 100 according to the present embodiment is shown in FIGS. 1 to 4. In the drawings, a flow path through which various gases such as a source gas flow is indicated by bold lines, and a flow path where those gases do not flow is indicated by fine lines. Also, regarding valves that open/close the flow path, a valve in an open state is shown by an outline, and a valve in a closed state is shown in black.

As shown in the drawings, the hydrogen production apparatus 100 according to the present embodiment includes:

a reforming unit 10 provided with a desulfurizer 12 that desulfurizes a source gas containing hydrocarbon (for example, a city gas 13A containing methane as a main component) to be pressure-fed by a pressure feeding apparatus 11, a reformer 13 that heats the desulfurized source gas in a state mixed with steam with a heating means 14 and obtains a reformed gas, and a CO transformer 17 that causes carbon monoxide in the reformed gas to react with steam;

a hydrogen separation unit 20 provided with a hydrogen purification unit 22 that separates impurities other than hydrogen from transformed gas after processing in the CO transformer 17 to purify hydrogen gas, a product tank 23, and an off-gas tank 21;

a gas flow path that allows gas to flow to the pressure feeding apparatus 11, the desulfurizer 12, the reformer 13, the CO transformer 17, and the hydrogen purification unit 22, in their stated order; and a control apparatus 30 that functions as a switching apparatus that controls gas flow operation, and based on a program, controls overall operation of the hydrogen production apparatus 100, including valve opening/closing operation of a PSA apparatus constituting the hydrogen purification unit 22, described later.

Also, a closed circulation circuit C, provided with a return path L10 that returns and circulates gas by the pressure feeding apparatus 11 in order of the desulfurizer 12, the reformer 13, and then the CO transformer 17 while bypassing the hydrogen purification unit 22, is provided in the gas flow path, and a purge gas supply path L11 is provided where a purge gas is supplied to the upstream side of the pressure feeding apparatus 11 in the gas flow path from the product tank 23.

The control apparatus 30 sequentially performs a hydrogen purification operation of driving the heating means 14 and the pressure feeding apparatus 11 to supply the source gas to the gas flow path, and a stopping operation of stopping the heating means 14 and the pressure feeding apparatus 11.

Prior to the stopping operation, the control apparatus 30 performs a purging step of replacing the gas within the gas flow path with the purge gas, and filling the purge gas into the gas flow path.

The control apparatus 30, in a start-up operation in which the heating means 14 is operated to increase the temperature of the gas within the gas flow path, which is performed prior to the hydrogen purification operation, performs a pressure increasing step of supplying the purge gas from the purge gas supply path L11 to the closed circulation circuit C, and increasing the pressure within the closed circulation circuit.

Reforming Unit

As described above, the reforming unit 10 is provided with the desulfurizer 12 that desulfurizes the source gas containing hydrocarbon (for example, the city gas 13A containing methane as a main component) to be pressure-fed by the pressure feeding apparatus 11, the reformer 13 that heats the desulfurized source gas in a state mixed with steam with the heating means 14 and obtains a reformed gas, and the CO transformer 17 that causes carbon monoxide in the reformed gas to react with steam.

Desulfurizer

The reforming unit 10 is provided with the desulfurizer 12 that receives supply of the source gas, which has been compressed by the pressure feeding apparatus 11 constituted from a compressor or the like, from a first flow path L1 constituting a gas flow path, and desulfurizes the source gas.

The desulfurizer 12 is filled with a desulfurization catalyst such as a Ni—Mo catalyst, a ZnO catalyst, or the like, and a sulfur component such as an odorant or the like in the source gas is removed by the desulfurization catalyst. As a result, the source gas is caused to have properties that make it difficult for a reforming catalyst filled into the reformer 13 to deteriorate.

Reformer

The desulfurized source gas is supplied to the reformer 13 by a second flow path L2 constituting the gas flow path. The reformer 13 is provided with the heating means 14 constituted from a burner apparatus or the like that, in order to maintain the reforming catalyst (for example, a nickel-based catalyst) filled into the reformer 13 at a catalyst activation temperature, burns a fuel gas (for example, the city gas 13A) supplied from the outside to heat the reforming catalyst.

In a second flow path L2 that supplies the source gas to the reformer 13, a mixing unit 16 is provided that mixes the source gas with steam heated to vapor by a first heat exchanger 15, which heats pure water using exhaust gas heat, and mixing of the steam into the source gas is promoted. In the reformer 13, the source gas mixed with the steam is heated and reformed by the reforming catalyst, thereby obtaining reformed gas.

CO Transformer

The reformed gas obtained in the reformer 13 is supplied to the CO transformer 17, which causes carbon monoxide in the reformed gas to react with steam through a third flow path L3 constituting a gas flow path. The CO transformer 17 is filled with a carbon monoxide shift catalyst, and carbon monoxide in the reformed gas reacts with steam to be converted into hydrogen and carbon dioxide. As the carbon monoxide shift catalyst, there are high temperature, medium temperature and low temperature shift catalysts, and a suitable catalyst is used according to the operating temperature. An example of a high-temperature catalyst having an operating temperature of 300 to 450° C. is an iron-chromium-based catalyst, and an example of a medium temperature catalyst having an operating temperature of 180 to 450° C., and a low temperature catalyst having an operating temperature of 190 to 250° C., is a copper-zinc-based catalyst. Also, two or more types among these high temperature, medium temperature and low temperature catalysts can be used in combination.

As a result of the reaction in the CO transformer 17, the reformed gas contains hydrogen, carbon monoxide, carbon dioxide, and methane, and is a transformed gas having a hydrogen concentration of 64 to 96 volume percent mixed in, and is discharged from the CO transformer 17 at about 300° C., decreases in temperature through heat exchange with cooling water in a second heat exchanger 18 through a fourth flow path L4, and afterward, steam and the like are removed by a gas-liquid separation unit 19, and then the gas is guided to the hydrogen separation unit 20 through a fifth flow path L5.

Closed Circulation Circuit

Also, a return path L10 that returns and circulates gas by the pressure feeding apparatus 11 in order of the desulfurizer 12, the reformer 13, and then the CO transformer 17 while bypassing the hydrogen purification unit 22, is provided branched in the fifth flow path L5, and with the first to fifth flow paths L1 to L5 and the return path L10, it is possible to configure the closed circulation circuit C where gas that has passed through the CO transformer 17 is returned and circulated to the desulfurizer 12, the reformer 13, the CO transformer 17, and the pressure feeding apparatus 11. Thus, gas that has passed through the CO transformer 17 can be returned to the upstream side of the pressure feeding apparatus 11 while bypassing the hydrogen purification unit 22.

Also, a purge gas supply path L11 that supplies the purge gas to the upstream side of the pressure feeding apparatus 11 in the gas flow path is provided, and thus the purge gas can be supplied to the upstream side of the pressure feeding apparatus 11 in the gas flow path. Specifically, the purge gas supply path L11 is configured to be connected to the product tank 23 and to a location that is on the downstream side of a throttle unit S described later and the upstream side of the pressure feeding apparatus 11 in the return path L10. Thus, before the stopping operation of stopping driving of the heating means and the pressure feeding apparatus, it is possible to perform the purging step of replacing the gas within the gas flow path with the purge gas, and filling the purge gas into the gas flow path, and possible to replace the gas within the closed circulation circuit with the purge gas. As a result, by adopting a gas such as hydrogen that usually is not inconvenient for hydrogen purification as the purge gas, at various locations leading to the gas supply path, it is possible to suppress adverse influences due to diffusion of carbon monoxide gas or the like generated by reforming the source gas.

A first return path L10b having a small flow path cross-sectional area that sets a large flow path resistance, and a second return path L10a having a large flow path cross-sectional area that sets a small flow path resistance, are provided in parallel in the return path L10.

A first on/off valve V10b is provided in the first return path L10b and a second on/off valve V10a is provided in the second return path L10a, and the throttle unit S, which switches between a throttled state in which a large flow path resistance of the return path L10 is set by opening the first on/off valve V10b and closing the second on/off valve V10a, and a throttle released state in which a small flow path resistance of the return path L10 is set by opening at least the second on/off valve V10a provided in the second return path L10a, is provided. Thus, it is possible to switch the return path L10 between the throttled state in which a large flow path resistance is set, and the throttle released state in which a small flow path resistance is set.

Normally, the desulfurization reaction in the desulfurizer 12 is an exothermic reaction and the CO shift reaction in the CO transformer 17 is an endothermic reaction, so by housing these in an integrated reaction vessel, it is possible for these reactions to exchange heat with each other, and thus the reaction efficiency can be improved.

Hydrogen Separation Unit

The hydrogen separation unit 20 is provided with the hydrogen purification unit 22, the product tank 23, and the off-gas tank 21. The hydrogen purification unit 22 is constituted from a PSA apparatus provided with a plurality (three in the present embodiment) of adsorption towers 20a, 20b, and 20c, and this PSA apparatus is capable of executing a pressure swing adsorption method (below, sometimes abbreviated as a PSA scheme or the like) in order to separate impurities other than hydrogen from the reformed gas reformed in the reforming unit 10.

Hydrogen Purification Unit

The adsorption towers 20a, 20b, and 20c in the hydrogen purification unit 22 are filled with a combination of a zeolite adsorbent, activated carbon, silica gel and the like as an adsorbent. In each of the adsorption towers 20a, 20b, and 20c, by executing the processes of an adsorption step, a pressure reduction step, the purging step, and the pressure increasing step in the plurality of adsorption towers 20a, 20b, and 20c in different phases, similar to a usual PSA scheme, hydrogen-rich gas can be continuously supplied as product hydrogen to a sixth flow path L6. Although a detailed explanation is omitted, the processes described above are sequentially executed by the control apparatus 30 specifically opening/closing a plurality of valves (not shown) provided in the respective flow paths configured to be connected to the plurality of adsorption towers 20a, 20b, and 20c.

Note that FIG. 1 shows a state in which the adsorption step of passing transformed gas through the adsorption tower 20a to obtain product hydrogen is being performed.

Hydrogen-rich gas having a hydrogen concentration of 95 to 99.9999 volume percent purified in the hydrogen purification unit 22 is supplied as product hydrogen through a valve V6 of the sixth flow path L6. The product hydrogen is temporarily stored in the product tank 23 and then stably supplied to a hydrogen usage location. Also, a pressure detection unit P that detects the internal pressure between the upstream side of the pressure feeding apparatus 11 and the downstream side of the connection location of the purge gas supply path L11 in the closed circulation circuit C is provided. The pressure detection unit P detects the pressure of mixed fluid containing hydrogen gas as the purge gas supplied from the product tank 23 through the purge gas supply path L11 to the return path L10, and gas that flows in the return path L10 of the closed circulation circuit C. Note that the pressure inside the product tank 23 is, for example, about 0.5 MPaG.

On the other hand, the off-gas after the hydrogen has been separated in the hydrogen separation unit 20 is temporarily stored in the off-gas tank 21 connected to the hydrogen separation unit 20 through a valve V7 of a seventh flow path L7. The off-gas stored in the off-gas tank 21 contains combustible gases such as hydrogen and methane, so this gas is guided to the heating means 14 through an off-gas flow path L8 and used as a fuel gas, as appropriate.

In FIG. 1, only the flow on the side of the hydrogen-rich gas, which is the product hydrogen, is shown, but there exists a timing where delivery of the product hydrogen and delivery of the off-gas are carried out simultaneously for the different adsorption towers 20a, 20b, and 20c.

Hydrogen Purification Operation

With the above configuration, in the hydrogen production apparatus 100 according to the present embodiment, after a start-up operation described below, as shown in FIG. 1, the valves V1, V5, and V6 are opened, the second on/off valve V10a is closed, and the first on/off valve V10b is opened, and the heating means 14 and the pressure feeding apparatus 11 are driven to supply the source gas by the pressure feeding apparatus 11.

Thus, after passing through the valve V1, the source gas is pressure-fed by the pressure feeding apparatus 11, and is passed through the first flow path L1 and guided to the desulfurizer 12 and desulfurized, and then guided to the reformer 13 through the second flow path L2 where the mixing unit 16 that mixes this gas with steam is provided. The desulfurized gas is reformed in the reformer 13, and then flows through the third flow path L3 and is transformed by the CO transformer 17, and guided to the gas-liquid separation unit 19 through the fourth flow path L4 where the second heat exchanger 18 is disposed, and then is guided through the fifth flow path L5 to the hydrogen separation unit 20. Then, a hydrogen purification operation is executed in the hydrogen production apparatus 100. When performing the hydrogen purification operation, the hydrogen purification unit 22 (the PSA apparatus) performs hydrogen purification by a pressure swing adsorption operation using an adsorbent that adsorbs and removes impurities other than hydrogen. Also, when performing the hydrogen purification operation, the first on/off valve V10b is open, so a state is established in which a part of the gas whose hydrogen content ratio has been increased by passing through the CO transformer 17 is always supplied to the desulfurizer 12, and thus the catalyst can be regenerated in the desulfurizer 12. Note that in this case, by the control apparatus 30 controlling opening/closing of the respective valves V1 to V12, the control apparatus 30 switches between a state in which a hydrogen purification operation is executed to drive the heating means 14 and the pressure feeding apparatus 11 to supply the source gas to the gas flow path, and a state in which a stopping operation is executed to stop driving of the pressure feeding apparatus 11 and the heating means 14 of the reformer 13.

Stopping Operation

When stopping operation of the hydrogen production apparatus 100 during a hydrogen purification operation, driving of the heating means 14 of the reformer 13 and the pressure feeding apparatus 11 is stopped.

Before performing the stopping operation, the purging step, in which the gas within the gas flow path is replaced with the purge gas and the purge gas is filled into the gas flow path, is performed. In the purging step, a purging step of the hydrogen purification unit 22 and a purging step of the reforming unit 10 are performed.

Purging Step of Hydrogen Purification Unit

When stopping operation of the hydrogen production apparatus 100, the valve V6 of the sixth flow path L6 and the valve V7 of the seventh flow path L7 are opened, and the valve V5 of the fifth flow path L5 is closed. Afterward, by opening the second on/off valve V10a of the return path L10 and closing the valve V1 of the source supply path, the closed circulation circuit C is formed. Then, hydrogen gas is supplied as the purge gas from the product tank 23 to the hydrogen purification unit 22. The purge gas is supplied to, among the adsorption towers 20a, 20b, and 20c, the adsorption tower in which depressurization and regeneration are not performed, and in which the adsorption step will be performed first when next restarting the hydrogen purification operation. The gas inside this adsorption tower is collected in the off-gas tank 21, or discarded.

With such a configuration, if the inside of the hydrogen purification unit 22 is replaced with hydrogen gas, void gas within the adsorption tower is maintained in a state filled with high-purity hydrogen gas. Therefore, when operation of the hydrogen purification unit 22 has been stopped in this state, it is unlikely for a state to occur in which a miscellaneous gas other than the hydrogen gas once adsorbed by the adsorbent disperses, thereby lowering the purity of the product gas, and even when operation of the hydrogen purification unit 22 is restarted, it is possible to wait in a state in which high-concentration hydrogen can be quickly supplied.

Purging Step of Reforming Unit

Figure 2:
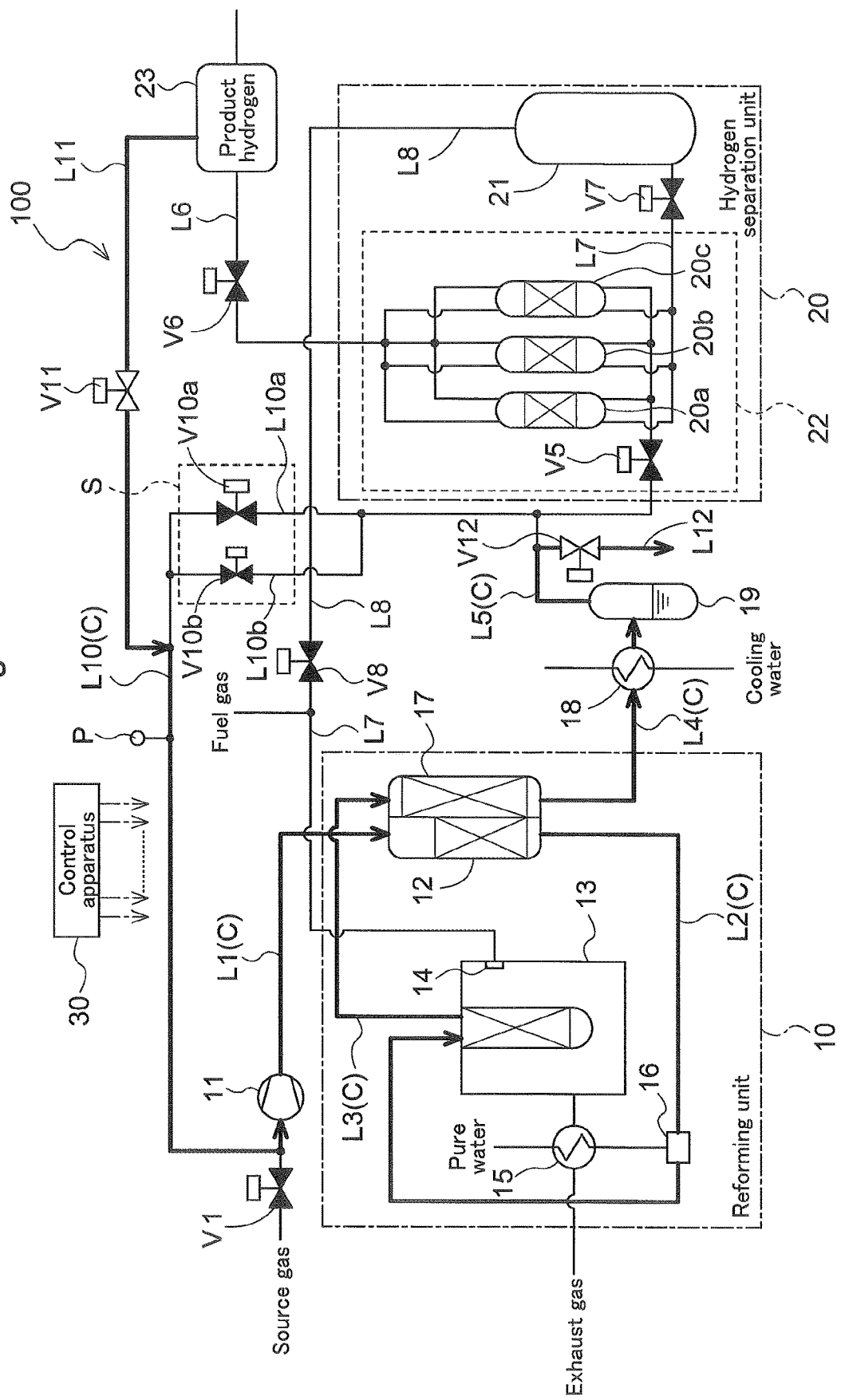
FIG. 2 shows a flow state of gas during a purging step of a reforming unit.

In the case of stopping the hydrogen production apparatus 100 over a long period of time (for example, about several days), after performing the purging step of the hydrogen purification unit 22 described above, in the reforming unit 10, the gas within the gas flow path is replaced with the purge gas, and the purging step (the purging step of the reforming unit) of filling the purge gas into the gas flow path is performed. As shown in FIG. 2, in the purging step of the reforming unit 10, supply of the source gas to the reforming unit 10 is stopped, the valves V1, V5, and V7 are closed, the valves V11 and V12 are opened, and the first on/off valve V10b and the second on/off valve V10a are closed, thus supplying hydrogen gas (about 0.5 MPaG) as the purge gas from the product tank 23 through the purge gas supply path L11 and the return path L10 to the reforming unit 10. In the purging step of the reforming unit 10, the gas within the reforming unit 10 is discharged to the outside through the opened valve V12. Afterward, heating by the heating means 14 of the reformer 13, supply of steam, and also driving of the pressure feeding apparatus 11 are stopped, thus putting the entire apparatus in a stopped state. In the stopping operation after performing the purging step of the reforming unit 10, the internal pressure of the closed circulation circuit C is about 0.2 MPaG.

Start-Up Operation

In a case where hydrogen purification operation is resumed after the entire apparatus has stopped, prior to performing a hydrogen purification operation, a start-up operation is performed in which the heating means 14 of the reformer 13 is operated to increase the temperature of the gas within the gas flow path. In the start-up operation, a pressure increasing step is performed in which the purge gas is supplied from the purge gas supply path L11 to the closed circulation circuit C, and the pressure in the closed circulation circuit C is made higher (for example, about 0.7 MPaG to 1.0 MPaG) than the pressure at the time of stopping the operation of the hydrogen production apparatus 100 (for example, about 0.2 MPaG), and at a timing that does not interfere with the pressure increasing step, a temperature increasing step is performed in which the reformer 13 is heated by the heating means 14.

Pressure Increasing Step

Figure 3:
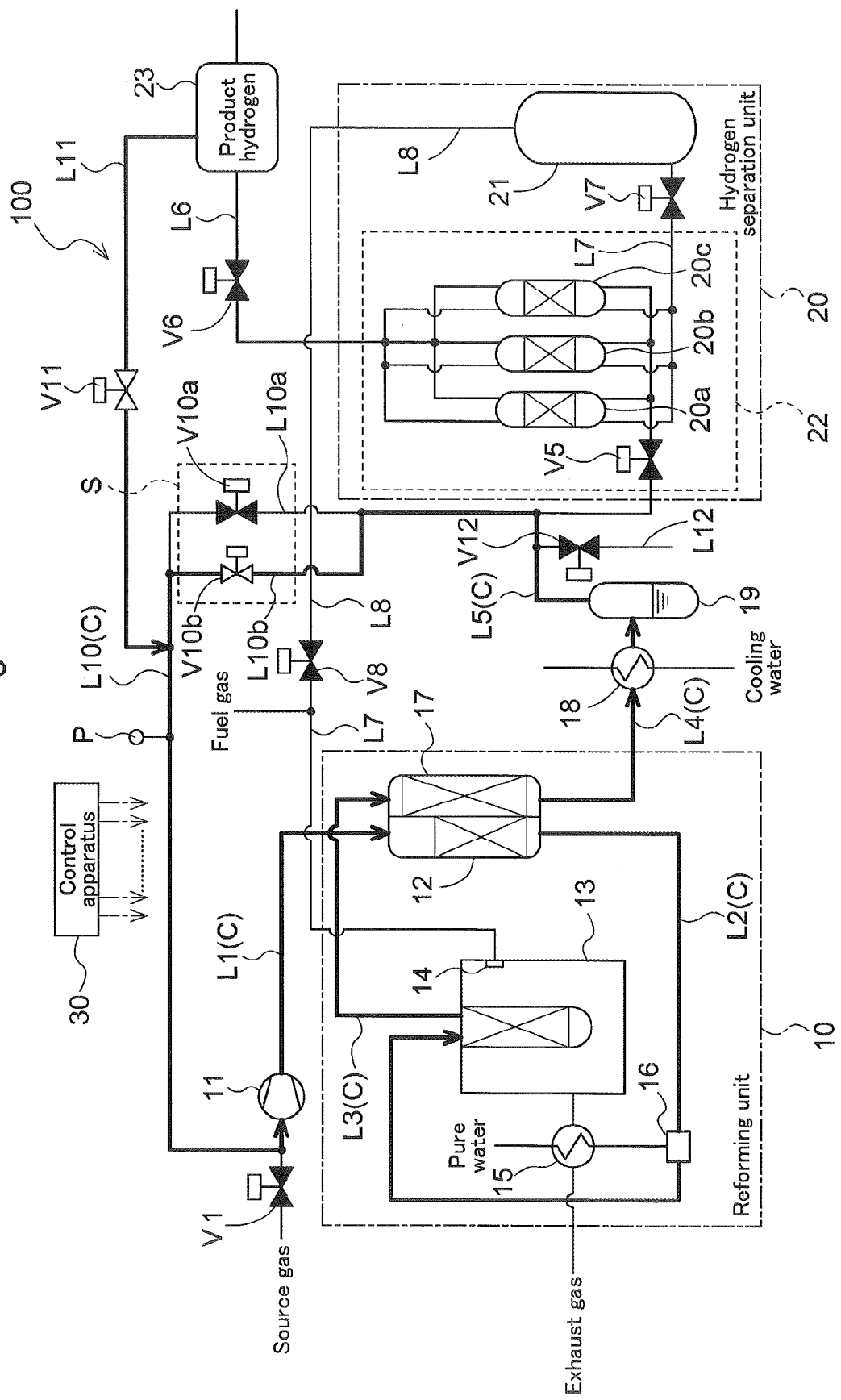
FIG. 3 shows a flow state of gas during a start-up operation (a pressure increasing step).

In the start-up operation, in the pressure increasing step, hydrogen gas (about 0.5 MPaG) used as the purge gas from the product tank 23 is supplied to the upstream side of the pressure feeding apparatus 11 in the gas flow path from the purge gas supply path L11. At this time, by closing the valves V1, V5, and V12, opening the valve V11, closing the first on/off valve V10b, and opening the second on/off valve V10a, the throttle released state, in which a small flow path resistance of the return path L10 (the throttle unit 5) is set, is established, and in a range where the pressure within the gas flow path can be increased with the internal pressure of the product tank 23 by supplying the purge gas, the purge gas is supplied to the gas flow path by the internal pressure of the product tank 23. When the internal pressure of the gas flow path due to the purge gas increases somewhat, as shown in FIG. 3, by opening the first on/off valve V10b and closing the second on/off valve V10a, the throttled state, in which a large flow path resistance of the return path L10 is set, is established, and the purge gas is supplied into the gas flow path by the pressure feeding apparatus 11 to increase the pressure. Specifically, by starting operation of the pressure feeding apparatus 11 in a state where supply of the purge gas from the product tank 23 is continued, it is possible to increase the internal pressure on the upstream side from the throttle unit S within the closed circulation circuit C and on the downstream side of the pressure feeding apparatus 11. At this time, on the downstream side of the throttle unit S and the upstream side of the pressure feeding apparatus 11, there is lower pressure than on the upstream side of the throttle unit S, so on the downstream side of the throttle unit S, it is possible to assist movement of the purge gas from the product tank 23 to the closed circulation circuit C through the purge gas supply path L11, thus promoting supply of the purge gas.

At this time, pressure is increased based on the pressure detected by the pressure detecting unit P provided in the return path L10, and when the detected pressure is lower than a predetermined pressure, the control apparatus 30 performs control to supply the purge gas from the purge gas supply path L11 into the closed circulation circuit C. Specifically, during hydrogen purification operation, the source gas at 0.5 MPaG is supplied to the gas flow path, in the purging step after the stopping operation, the pressure inside of the closed circulation circuit C becomes a pressure (0.2 MPaG) near atmospheric pressure, and in the pressure increasing step, the pressure inside of the closed circulation circuit C is increased to 0.7 MPaG.

Heating Step

Figure 4:
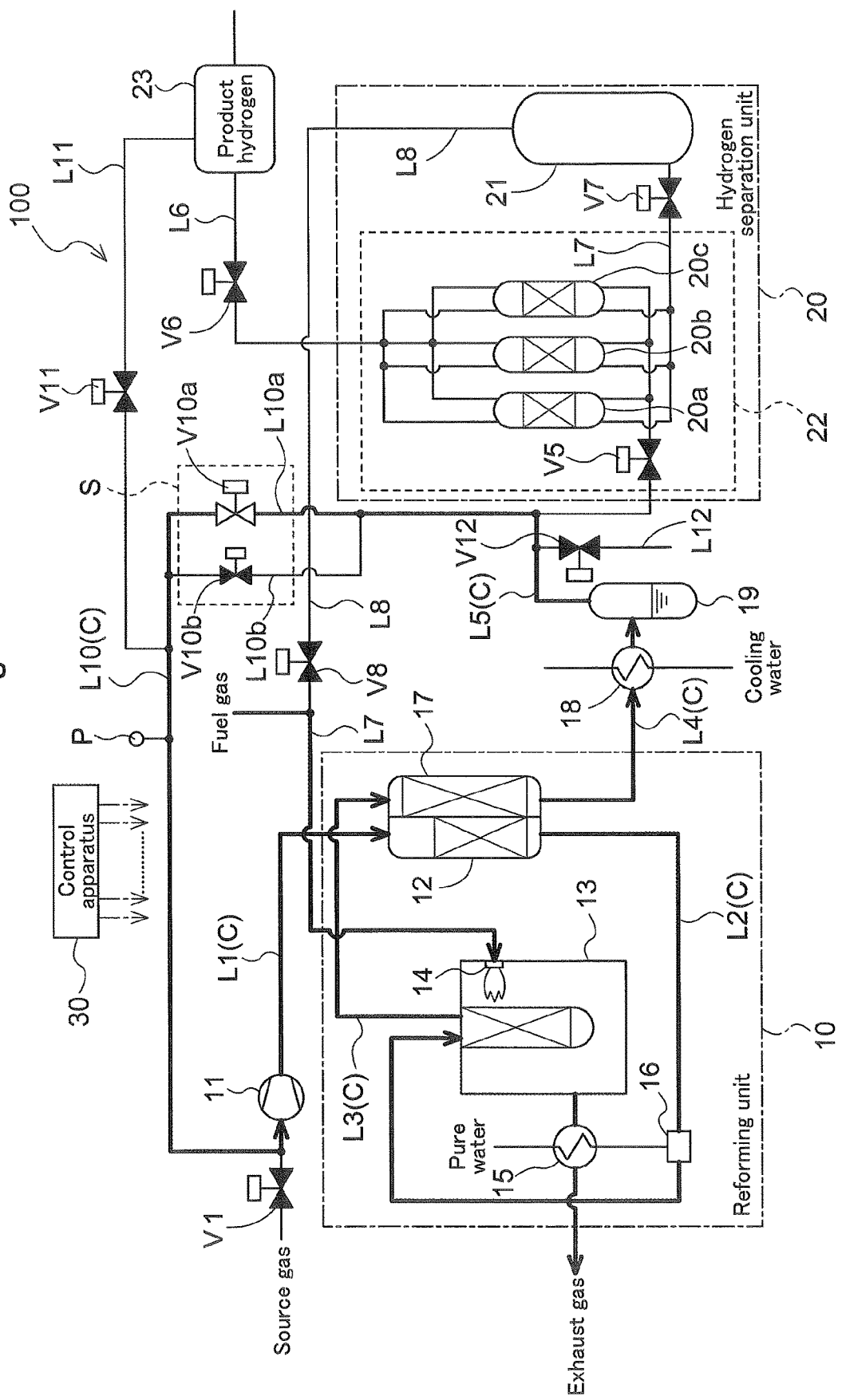
FIG. 4 shows a flow state of gas during a start-up operation (a temperature increasing step).

Afterward, the gas within the gas flow path is circulated within the closed circulation circuit C, the fuel gas is supplied to the heating means 14, and heating of the reforming unit 10 is started. Specifically, as shown in FIG. 4, by closing the first on/off valve V10b and opening the second on/off valve V10a, the closed circulation circuit C is formed in the throttle released state in which a small flow path resistance of the return path L10 is set, and the purge gas within the closed circulation circuit C is circulated by the pressure feeding apparatus 11.

Thus, the heat conferred to the reformer 13 by the heating means 14 is transferred to the purge gas, and while circulating within the closed circulation circuit C, supplies heat to the CO transformer 17 and the desulfurizer 12, in that order. Thus it is possible to increase the temperature of the entire reforming unit 10 (specifically, the CO transformer 17), and it is possible to establish a state in which it is possible to quickly reform the source gas, and start the hydrogen purification operation in the hydrogen separation unit 20. Specifically, in a case where a start-up operation was performed without performing a pressure increasing operation, a time of 3 hours and 45 minutes was required from the start of the start-up operation to completion of the temperature increase, but when the start-up operation (with the pressure increasing operation) according to the present embodiment was performed, it was found that the temperature increase could be completed in 2 hours and 30 minutes.

Other Embodiments (1) In the above embodiment, an example is described in which city gas is used as the source gas, but as another example, it is also possible to use a heavy naphtha or the like having a final boiling point of about 240° C. from gaseous hydrocarbon, for example.

(2) The location of the pressure feeding apparatus 11, the arrangement of the heat exchanger, and the like are not limited to the arrangement in the above embodiment, and various well-known arrangements can be adopted. That is, in FIGS. 1 and 2, the pumping apparatus 11 is provided on the upstream side (the source supply side) of the desulfurizer 12, but the pumping apparatus 11 may also be provided on the downstream side of the reformer 13, that is, it is sufficient that the pressure feeding apparatus 11 is provided such that in the hydrogen purification operation, it is possible to transport the source gas, and gas can flow in the closed circulation circuit C. Also, there may be a plurality of the pressure feeding apparatuses 11. Also, although the desulfurizer 12 and the CO transformer 17 are disposed so as to exchange heat in the above embodiment, they may also be separately provided.

(3) Also, a PSA apparatus was used as the hydrogen purification unit 22, but various hydrogen purification apparatuses such as a film separation apparatus or a cryogenic separation apparatus can be provided singly or in combination. Also, although the type of PSA apparatus is shown in the drawings as a three tower apparatus, this is not a limitation, and the PSA apparatus may be configured with two towers, or with four or more towers, and an arbitrary operation mode can be adopted in the PSA apparatus.

(4) In the above embodiment, the purge gas is hydrogen gas from the product tank 23, but the purge gas is not limited to hydrogen gas, and a mode may be adopted in which hydrogen gas is supplied from a separately provided hydrogen tank, or a mode may be adopted in which hydrogen gas supplied from the hydrogen purification unit 22 is used as-is. However, when the product tank 23 is used, hydrogen used as the purge gas can be stably supplied, and it is sufficient to only provide the purge gas supply path L11 in addition to existing piping, which is preferable because the configuration of the apparatus can be made relatively simple. Further, an inert gas can be used instead of hydrogen. However, when a gas other than hydrogen gas such as an inert gas is used, after a start-up operation, when starting a hydrogen purification operation, hydrogen purification is not performed in the hydrogen purification unit 22 for a period of time required in order to discharge the inert gas, so it is preferable to use hydrogen gas.

(5) In the above embodiment, as the return path L10 that returns and circulates gas while bypassing the hydrogen purification unit 22 in the closed circulation circuit C, the first return path L10b having a small flow path cross-sectional area and the second return path L10a having a large flow path cross-sectional area are provided in parallel, and the throttle unit S is configured to switch between a throttled state in which a large flow path resistance of the return path L10 is set by opening the first on/off valve V10b provided in the first return path L10b and closing the second on/off valve V10a provided in the second return path L10a, and a throttle released state in which a small flow path resistance of the return path L10 is set by closing the first on/off valve V10b and opening the second on/off valve V10a. Modifying this configuration, it is also possible to configure the throttle portion S by providing a flow rate adjustment valve in a single return path L10. However, it is possible to switch between the throttled state and the throttle released state merely by valve opening/closing switching, and a flow rate adjustment valve that can precisely change the flow rate across both the throttled state having a small flow rate and the throttle released state having a large flow rate is expensive, and control is necessarily complicated, so the former configuration is preferable. Also, if the second return path L10a is provided, this path can also function as the return path L10 that constantly returns hydrogen gas for regenerating the desulfurization catalyst to the desulfurizer 12.

Also, it is sufficient to adopt a configuration in which, in the throttle released state in the throttle unit S, a small flow path resistance is set for the return path by at least opening the second on/off valve V10a, and a configuration can also be adopted in which the first on/off valve V10b is not closed.

(6) Also, in the above embodiment, the pressure increasing step and the temperature increasing step are sequentially performed in a start-up operation, but heating can also be started without waiting for the pressure increasing to be completed, or can be started at the same time. If the pressure increasing step and the temperature increasing step are sequentially performed, safe operation is possible without concern for thermal expansion or the like of the purge gas, and if they are started at the same time, quick start-up operation becomes possible. Note that, when considering the timing of supplying steam to the reformer 13, it is preferable to not supply steam in the pressure increasing step and start supplying steam during the temperature increasing step, and therefore it is preferable to sequentially perform the pressure increasing step and the temperature increasing step.

INDUSTRIAL APPLICABILITY

The hydrogen production apparatus of the present invention, and the operation method for the hydrogen production apparatus, can be effectively utilized as a technique for quickly heating a desulfurizer, a reformer, and a CO transformer in a case where after stopping operation of the hydrogen production apparatus, the hydrogen production apparatus is restarted.

DESCRIPTION OF REFERENCE SIGNS 10 reforming unit
11 pressure feeding apparatus
12 desulfurizer
13 reformer
13A city gas
14 heating means
15 first heat exchanger
16 mixing unit
17 CO transformer
18 second heat exchanger
19 gas-liquid separation unit
20 hydrogen separation unit
20a adsorption tower
20b adsorption tower
20c adsorption tower
21 off-gas tank
22 hydrogen purification unit
23 product tank
30 control apparatus
100 hydrogen production apparatus
C closed circulation circuit
L1 to L7 first to seventh flow paths
L8 off-gas flow path
L10 return path
L10a second return path
L10b first return path
L11 purge gas supply path
L12 exhaust path
P pressure detection unit
S throttle unit
V1 to V12 valve
V10a second on/off valve
V10b first on/off valve

The invention claimed is:

1. An operation method for a hydrogen production apparatus, the hydrogen production apparatus comprising a desulfurizer that desulfurizes a source gas, a reformer that heats the desulfurized source gas in a state mixed with steam with a heater and obtains a reformed gas, a CO transformer that causes carbon monoxide in the reformed gas to react with steam and obtains a transformed gas, and a hydrogen purification unit that separates impurities other than hydrogen from the transformed gas after processing by the CO transformer to purify hydrogen gas, the operation method comprising:
providing a gas flow path that allows gas comprising at least one of the source gas, the desulfurized source gas, the reformed gas, the transformed gas, and/or the hydrogen gas to flow to the desulfurizer, the reformer, the CO transformer, and/or the hydrogen purification unit, and providing a pressure feed configured to cause the gas to flow in the gas flow path,
providing a hydrogen purification operation for operating the heater and the pressure feed to supply the gas to the gas flow path, and a stopping operation configured to stop operation of the heater and the pressure feed, being performed in order,
providing in the gas flow path a closed circulation circuit that returns and circulates the gas by the pressure feed in an order of the desulfurizer, the reformer, and then the CO transformer while bypassing the hydrogen purification unit, and providing a purge gas supply path where a purge gas is supplied to an upstream side of the pressure feed in the gas flow path,
providing a throttle unit in a return path that returns and circulates the gas while bypassing the hydrogen purification unit in the closed circulation circuit, the throttle unit switching between a throttled state in which a large flow path resistance is set and a throttle released state in which a small flow path resistance is set,
prior to the stopping operation, performing a purging step of replacing the gas within the gas flow path with the purge gas and filling the purge gas into the gas flow path, and
in a start-up operation in which the heater is operated to increase the temperature of the gas within the gas flow path, which is performed prior to the hydrogen purification operation, performing a pressure increasing step for supplying the purge gas from the purge gas supply path to the closed circulation circuit and increasing the pressure within the closed circulation circuit while operating the pressure feed, and subsequently performing a temperature increasing step for operating the pressure feed and the heater and increasing the temperature,
wherein the pressure increasing step is performed with the throttle unit switched to the throttled state, and the temperature increasing step is performed with the throttle unit switched to the throttle released state.

2. The operation method for the hydrogen production apparatus according to claim 1, comprising providing a pressure detection unit that detects an internal pressure within the closed circulation circuit, and when performing the start-up operation, in a case where the pressure detected by the pressure detection unit is lower than a predetermined pressure, supplying the purge gas into the closed circulation circuit from the purge gas supply path.

3. The operation method for the hydrogen production apparatus according to claim 2, wherein the purge gas is hydrogen gas that has been purified by the hydrogen purification unit, and stored in a product tank.

4. The operation method for the hydrogen production apparatus according to claim 1, wherein the purge gas is hydrogen gas that has been purified by the hydrogen purification unit, and stored in a product tank.

5. The operation method for the hydrogen production apparatus according to claim 1, wherein:
the return path includes a first return path having a small flow path cross-sectional area that sets a large flow path resistance, and a second return path having a large flow path cross-sectional area that sets a small flow path resistance, the first and second return paths being arranged in parallel, and
the throttle unit switches between the throttled state in which a large flow path resistance of the return path is set by opening a first on/off valve provided in the first return path and closing a second on/off valve provided in the second return path, and the throttle released state in which a small flow path resistance of the return path is set by opening at least a second on/off valve provided in the second return path.

\* \* \* \* \*